3,471,423
Patented Oct. 7, 1969

3,471,423
POLYURETHANE MATERIALS HAVING BIOCIDAL PROPERTIES AND THEIR PRODUCTION
Otto C. Elmer, Akron, and Joe S. Duncan, Cuyahoga Falls, Ohio, assignors to The General Tire & Rubber Company, a corporation of Ohio
No Drawing. Filed Nov. 7, 1966, Ser. No. 592,260
Int. Cl. C08g 22/04; C08d 9/00
U.S. Cl. 260—22                                                5 Claims

ABSTRACT OF THE DISCLOSURE

Polyurethane materials having biocidal properties are prepared by reacting usual polyurethane forming substances in the presence of a quaternary ammonium salt having biocidal properties and capable of serving as a catalyst for the polyurethane reaction, e.g., a quaternary ammonium salt containing the saccharinate or cyclamate anion. The resulting biocidal polyurethane materials may be used as millable rubber stocks, castings, sealants, adhesives, coatings and thermoplastics.

FIELD OF THE INVENTION

Although the production of synthetic polymers of the polyurethane class is a relatively new chemical art covering less than about a quarter century, it has become highly developed. As a result, a wide variety of polyurethane systems have been discovered and commercially exploited including elastomers, rigid and flexible foams, castings, sealants, fibers, adhesives, coatings and thermoplastics. The present invention is particularly useful in connection with elastomeric polymers of the polyurethane class but its benefits, at least in part, may be extended to other polyurethane systems.

Polyurethane materials possess certain disadvantages which are known to the trade and upon which considerable effort has been and is being expended in attempts to eliminate or mitigate these deficiencies. One such problem is the propensity for polyurethane materials to undergo biocidal attack, i.e., deterioration of the polyurethane material upon contact with fungi or bacteria. In many end uses of polyurethane materials, biocidal attack is relatively unimportant but in connection with certain classes of these materials, such as polyurethane paints, varnishes and cellular products, particularly in hot and humid locations such as the tropics, the problem is acute and oftentimes mitigates against the utilization of a polyurethane material for the end use under consideration. At least a part of the invention described herein concerns effective ways of overcoming the biocidal deterioration of polyurethane materials.

In the formation of polymers of the polyurethane class, it is necessary to employ catalysts and accelerators in order to produce the polymers from their basic ingredients. Numerous materials have been employed as urethane catalysts but, notwithstanding the large numbers of substances which have been tested and utilized for this purpose, a majority of the effective catalysts have certain defects. Thus, amines which constitute a major class of polyurethane catalysts, are objectionable because of their action as skin-irritants, particularly in such end use items as foundation garments, shoes, boots, jackets and other leather garments and the like. They also cause accelerated deterioration at elevated temperatures. Moreover, in many procedures used in the production of polyurethane articles, a preliminary batch or premix is employed as an initial production material and catalysts in such environments must not cause premature curing or reaction.

Other problems have been encountered in the use of catalysts in production of polyurethane materials. For example catalysts may produce side reactions not directed to urethane formation which create undesired characteristics in the final polymer product. This is typical of the fast action, or so-called "hot," catalysts used in urethane foam production, particularly water-blown foam making, so that such foam producing catalysts are generally unuseable for production of solid polymers, casting products and the like.

Troubles also are encountered in use of catalysts for urethane systems where there is relatively little difference in reaction rate of the catalyzed premix at low temperatures usually employed for mixing and storing of the urethane reactants as compared with the elevated temperatures at which the premix is cast or otherwise formed or cured. Short pot life or undesirable long curing times are the symptoms of this catalyst problem and creates the problems in premixes as previously mentioned.

In view of these facts, there is a strong demand in the trade for urethane catalysts which possess very low toxicity and skin irritation characteristics, do not cause accelerated deterioration, which are highly temperature dependent, thereby providing a combination of good pot life and short ultimate reaction time, and which are highly selective as to the urethane reaction, giving rise to a minimum of side reactions.

In the class of polyurethane materials known as millable rubber products, special problems have been encountered. In this portion of the polyurethane industry, it is standard practice to manufacturers to supply customers with polyurethane gum stocks which are handled by the user as slab rubber in established compounding and fabricating operations. Such polyurethane gum stocks often are stored for prolonged periods of time before compounding and not infrequently at relatively high temperatures. It is desirable, therefore, to have available some means by which the polyurethane slab rubber or other gum stock may be provided with biocidal protection. A principal method of obtaining this in the past has been to incorporate a biocide in the gum stock by a milling step but this is undesirable because it adds to the cost of the final product, involves the possibility of non-uniform mixing and can result to some extent in degradation of desired properties of the gum stock. It would be advantageous, therefore, if some method were provided for rendering the polyurethane material as it is formed initially by the urethane reactants resistant to fungi and bacteria without need to incorporate a biocide by milling or comparable after treatment. Since polyurethane rubber stocks are frequently subjected to peroxide catalyzed vulcanizing or curing steps, it is desirable that any scheme which would be employed to provide biocidal protection to the polyurethane rubber stock would be capable of withstanding the strong oxidizing action of the peroxides so that the biocidal protection would be carried through to the final vulcanized or cured product.

OBJECTS

A principal object of this invention is the provision of a new class of ingredient to be used in the production of polyurethane materials.

Further objects include the provision of:
(1) Polyurethane materials possessing improved protection against degradation by fungi and bacteria.
(2) Methods of catalyzing the formation of polyurethane materials which also impart biocidal properties to the finished product.
(3) A class of biocides which can be used to catalyze formation of polyurethane materials without detrimentally effecting the compression set of the cured material.
(4) A class of quaternary ammonium salts having unique catalytic properties in the formation of polyurethane materials of the solid rubber type.

(5) Combined catalyst/biocides for use in formation of polyurethane materials that are capable of retaining biocidal activity even after exposure to peroxide curing conditions that may be employed in the formation of the polyurethane materials.

(6) Information concerning the advantages of using quaternary ammonium salts as catalysts for urethane reactions and, particularly, in the production of non-cellular polyurethane resin products.

(7) New urethane catalysts that are highly temperature dependent.

(8) Polyurethane resin forming compositions possessing the combination of good pot life and short ultimate reaction time.

(9) A class of catalysts for use in formation of polyurethane materials that have relatively good solubility in polyurethane reactants and are capable of providing biocidal protection to polyurethane gum stocks during possible prolonged periods of storage before compounding.

(10) Polyurethane gum stocks and millable polyurethane rubber systems possessing improved storage and color properties.

(11) A class of catalysts useful in reaction of isocyanates with hydroxy-terminated or amine terminated polyesters, polyamides or other materials, in addition to polyethers and polyesters.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished in accordance with the present invention by incorporating quaternary ammonium salts as hereinafter defined as an active component in the ingredients used to form polyurethane materials. Advantageously, the quaternary ammonium salts will be employed in the polyurethane forming mixture in an amount between about 0.1 to 5 parts for each 100 parts of reactants present in the polyurethane forming mixture.

Quaternary ammonium salts to be used in the invention may be represented by the following general formula:

wherein

Z is the saccharinate or cyclamate anion, $R_1$ is an alkyl radical containing 1 to 24 carbon atoms, particularly 6 to 24 carbon atoms, and $R_2$, $R_3$ and $R_4$ are radicals selected from the group alkyl, cycloalkyl, aralkyl, aryl and alkaryl, two or three of which may be combined in a ring structure incorporating the nitrogen atom as a heterocyclic group, e.g., pyridine, piperidine, morpholine, triethylenediamine type radicals. These radicals may contain up to 24 carbon atoms and those containing 6 to 24 carbon atoms are advantageous although with alkyl radicals, etc., they may contain 1–24 carbon atoms.

In the preferred operations in accordance with the invention, quaternary ammonium salts which act as combined catalyst and biocide are trialkyl aralkyl ammonium saccharinates in which one of the alkyl groups contains 10 to 18 carbon atoms, the other two alkyl groups contain 1 to 6 carbon atoms and the aralkyl group consists of a monocyclic aromatic hydrocarbon radical attached to an alkylene radical containing 1 to 6 carbon atoms. Further, the polyurethane material is produced by heating a composition comprising an organic diisocyanate, an active hydrogen containing compound, advantageously, a polyester or polyether, and the quaternary ammonium saccharinate at 0.1 to 5 parts per 100 parts of reactants.

The success of the present invention is due, in a large measure, to the discovery that quaternary ammonium salts, and particularly those containing an alkyl radical having 6 to 24 carbon atoms, are capable not only of catalyzing the reaction of polyisocyanates with active hydrogen compounds to form polymers of the polyurethane class, but that the biocidal properties possessed by these quaternary ammonium compounds are not destroyed in the course of the polyurethane formation and that this carries through to the final polymer imparting thereto biocidal properties. The invention is also dependent upon a further discovery that these quaternary ammonium salts in their operation as polyurethane forming catalysts are highly temperature dependent in their catalytic activity, thereby making it possible to form prepolymer mixtures possessing a good combination of long pot life and short ultimate reaction time.

The use of quaternary ammonium compounds broadly as catalysts for polyurethane materials is not new, one such disclosure being found, for example, in U.S. 3,108,975. Prior use in the formation of polyurethane materials of quaternary ammonium compounds as active ingredients have employed fast acting quaternary compounds of highly alkaline reaction comparable in catalytic activity to alkali metal hydroxides. In contrast, quaternary ammonium salts as encompassed by the present invention react as mildly alkaline or slightly acidic when suspended in water. For example, the commercially available quaternary ammonium saccharinate designated "HQ3300" when dispersed in water gives a solution of pH about 6.2. The promotion of the urethane reaction by the combined catalyst/biocides of this present invention, therefore, is unique.

Improvements in the art of producing polyurethane materials is also provided as a result of the further discoveries that some quaternary ammonium salts have a relatively high solubility in the prepolymer mixtures normally employed in the formation of polyurethane materials, possess relatively very low toxicity, including substantially no skin irritation effects and the biocidal activity of these ingredients when contained in the polyurethane materials is capable of withstanding peroxide curing conditions which may be employed in the curing or vulcanization of rubber stocks formed from the polyurethane materials.

EXAMPLES

A more complete understanding of the new methods and products of this invention may be obtained from the following report of representative operations and results. In reporting these data and throughout the remaining specification and claims, all parts and percentages are by weight and all temperatures are in degrees centigrade unless otherwise specified.

Example 1

This example illustrates the preparation of a cured polyurethane elastomer using the improvements afforded by the invention and compares the biocidal properties of such product with a related elastomer made according to a standard known method.

A polyurethane gum stock was prepared by mixing together 400 parts of polyethylenebutylene adipate, 49 parts of MDI [methylene bis(4-phenyl isocyanate)] and heating the mixture for about 48 hours at 120° C. The resulting batch was designated "standard" for identification. The adipic acid ester used in this operation was a polymeric ester formed by reaction of about 0.9 mole adipic acid with a mixture of 0.6 mole ethylene glycol and 0.4 mole butylene-1,4-glycol.

A second batch of gum stock, designated "new" for identification, was prepared by repetition of the above procedure with the exception that 2.25 parts of alkyl dimethyl benzyl ammonium saccharinate was added to the other ingredients prior to the heating step and the mixture was reacted about 5 hours at 120° C. The saccharinate was a commercially available material designated "HQ3300" in which the alkyl moiety consisted of a statistical mixture of C12–18 alkyl groups equivalent to about 15 carbon atoms.

One hundred parts of each of the separate batches were then compounded with 0.2 part stearic acid, 25 parts carbon black (commercial product "FEF") and 4 parts of "DiCup 40–C" (40% active dicumyl peroxide) and the composition was press-cured into standard rubber test samples at 160° C. for 20 minutes.

One group of the test samples, designated "original" were promptly subjected to established test procedures for strength, etc., while a second group, designated "aged" were heated in a hot air oven at 150° C. for 200 hours. The results of these tests are reported in the following table:

TABLE I

|  | Standard | New |
|---|---|---|
| Original: |  |  |
| 100% modulus, p.s.i. | 300 | 325 |
| 300% modulus, p.s.i. | 2,075 | 2,050 |
| Tensile, p.s.i. | 4,250 | 4,050 |
| Elongation, percent | 510 | 520 |
| Shore "A" hardness | 63 | 64 |
| Aged: |  |  |
| 100% modulus, p.s.i. | 200 | 200 |
| 300% modulus, p.s.i. | 1,350 | 1,150 |
| Tensile, p.s.i. | 2,725 | 2,750 |
| Elongation, percent | 520 | 590 |
| Shore "A" hardness | 57 | 57 |

A further group of test samples from each batch were coated with a water dispersion of fungi (Aspergillus, Alternaria, Penicillium) and bacteria (Achrombacter) and were suspended over water at room temperature. After one month, the "standard" samples were severely degraded with many large cracks and holes while the "new" samples had only a few pin holes. The results of this fungus resistance test shows that incorporation of the trialkyl benzyl saccharinate in accordance with the invention provides a high degree of resistance to fungi and bacteria to polyurethane materials.

Example 2

This example illustrates the catalytic activity of quaternary ammonium saccharinates with polyurethane forming materials.

A polyurethane forming mixture was prepared by mixing together 400 parts of polyethylene butlylene adipate and 49 parts of MDI. This mixture was designated as "Control."

A second mixture, designated "New A," was prepared from the same ingredients plus 2.25 parts of lauryl isoquinolinium saccharinate (a commercially available material called "HQ4330").

A third mixture, designated "New B," was prepared from the same ingredients as "Control" plus 2.25 parts of "HQ3300."

The three separate reaction mixtures were put in a 120° C. oven and their rates of reaction were followed by measuring Williams Plasticities at various times, a standard procedure for evaluating polyurethane additives. The times to reach the maximum values of Williams Plasticities (times for complete reaction) were 29 hours for the "Control," 21 hours for the mixture "New A" and approximately 2 hours or less for the mixture "New B" as shown in the following table:

TABLE II

| Hours reaction at 120° C | Plasticity | | |
|---|---|---|---|
|  | Control | New A | New B |
| 2 | 75 | 104 | 136 |
| 8 | 109 | 123 | 133 |
| 21 | 123 | 126 | 126 |
| 29 | 125 | 123 | 121 |
| 53 | 123 | 116 | 111 |

The powerful catalytic action of "HQ3300" at 120° C. is especially noteworthy, since no problem occurred with pot life during the mixing operation at 60° C. The catalytic action of the "HQ3300" was found to be very dependent on temperature.

In another case, the temperature effect on the catalytic action was investigated by mixing MDI with polyethylene-butylene adipate at various temperatures with and without the inclusion of 0.5% of "HQ3300." The times in minutes for a viscosity increase of 5000 centipoises was measured for both the catalyzed and uncatalyzed reactions. The results are reported in the following table:

TABLE III

| | Time for 5,000 centipoise, viscosity ries | |
|---|---|---|
| Mixing temperature | Uncatalyzed | Catalyzed with 0.5% HQ3300 |
| 45° C | 64 minutes | 27 minutes. |
| 80° C | 44 minutes | 6.2 minutes. |

These data show that the catalytic effect of "HQ3300" is much greater at the higher temperature. An increase in the temperature from 45° C. up to 80° C. resulted in an increase in reaction rate of only 45% for the uncatalyzed reacion, but resulted in 4-fold increase in reaction rate for the mixture containing the "HQ3300." A similar study was made of the temperature effect on the catalytic action of "HQ3300" and triethylene diamine, a tertiary amine catalyst. The results are reported in the following table:

TABLE IV

| Mixing temperature | With 0.01% triethylene diamine | With 0.5% HQ3300 |
|---|---|---|
| 60° C | 10 minutes | 22 minutes. |
| 100° C | 5.5 minutes | 5.5 minutes. |

At the concentrations employed, both catalysts effected the same reaction rate at 100° C., but at the lower temperature of 60° C., "HQ3300" was considerably less active and, therefore, did not affect pot life as much as triethylene diamine.

Example 3

The example illustrates use of alkyl quaternary ammonium saccharinates in polyetherurethane formation.

The addition of 0.5% "HQ3300" was found by the plasticity test procedure described in Example 2 to reduce the reaction time at 120° C. of MDI and polytetramethylene ether glycol (commercial product "F331–43") by 33%. The saccharinate also reduced the amount of discoloration during the reaction as compared with a control batch.

In another case, 0.5% "HQ3300" gives a 26% reduction in the time for reaction to a given viscosity at 120° C. of 2,4-toluene diisocyanate and polypropylene glycol (commercial product "Voranol P–1200").

Example 4

This example illustrates relative activity of various types of quaternary ammonium salts in catalyzation of the reaction.

The effect of equimolar amounts of quaternary ammonium salts was tested on the reaction of 0.05 mole phenylisocyanate with 0.5 molar n-butyl alcohol in toluene solution. Rate constants were computed from the plot of isocyanate concentration versus time. The isocyanate concentration was determined by measurement of the infrared absorption peak at 4.5μ. Table V shows results obtained.

TABLE V

| Alkyl groups in cation | Anion | Relative reactivity— | |
|---|---|---|---|
| | | At 24° C. | At 100° |
| Me Me C₁₄Bz | | 1.00 | 4.0 |
| | Sa | 1.10 | 5.9 |
| Quinoline Lau | Sa | 1.06 | 5.9 |
| Me Me Bz Bz | Cl | 1.04 | 4.9 |

Me=methyl, Bz=benzyl, Lau=Lauryl, Sa=Saccharinate anion.

These data illustrate the relatively good catalytic activity of the saccharinates for production of polyurethane materials and the high temperature dependency of this catalytic activity.

Example 5

This example illustrates the catalytic action that quaternary ammonium salts have in the reaction of a diisocyanate prepolymer with a polyamine to give a polyurea.

As one of the reagents, there was used an isocyanate prepolymer in the form of a liquid reaction product of polytetramethylene ether diol and 2,4-toluene diisocyanate (TDI) ("Adiprene L–100"). This prepolymer contained practically no free TDI and had 4.0–4.2% NCO content.

The diamine used for the extension and cross-linking reaction was 4,4'-methylene-bis-(2-chloroaniline) (trademark product "MOCA"). These materials were mixed in such proportions that there remained a slight excess of —NCO calculated on the basis that an —NH₂ group reacts with an —NCO group. The resulting mixture was properly heat-cured and aged producing a rubbery product with excellent physical properties.

In another case, castings were prepared at 70° C. by mixing molten "MOCA" with warm "Adiprene L–100," the mixture was degased and then poured into a prepared mold.

In preparing smaller molded articles economically, it is necessary to shorten the de-molding time as much as possible since the same mold has to be re-used. The following table shows how gelling proceeds in this system in the presence of stearic acid as an accelerator and compares its effect to the quaternary ammonium stearate:

TABLE VI

| Stearic Acid, p.p.h. of "Adiprene" | 0 | 0.27 | 0.55 | 1.1 | 2.0 |
|---|---|---|---|---|---|
| Time A | 12 | 9.5 | 4.1 | 4.0 | 4.3 |
| Time B | 2 | 0.5 | .3 | 0.1 | 0.1 |
| Time C | 6 | 4.0 | 2.8 | 1.3 | 1.1 |
| Total demolding time | 20 | 14.0 | 7.2 | 5.4 | 5.5 |
| Benzyl trimethyl ammonium stearate, p.p.h. of "Adiprene" | 0 | 0.05 | 0.1 | 0.25 | |
| Time A | 12 | 3.2 | 3.0 | 0.8 | |
| Time B | 2 | 0.5 | 0.5 | 0.1 | |
| Time C | 6 | 4.5 | 4.5 | 1.3 | |
| | 20 | 8.2 | 8.0 | 2.2 | |

All times in Table VI are given in minutes. This test was performed in a heated mold at 120° C. after the components had been mixed and degassed from 30 seconds. Time A is a measure of the period of pourability of the liquid mixture. During this time, the casting liquid can still be poured into a mold. Time B gives an indication of the time required to convert the highly viscous liquid into a gel. Time C is the time span between a weak gel form and a casting strong enough to be demolded and keep its desired shape. This test is somewhat subjective since the different time periods are judged by hand testing with a metal spatula. The sum of times $A+B+C$ gives a measure of total demolding time. It can be seen from Table VI that quaternary ammonium stearate is much more efficient at low concentration than stearic acid. Furthermore, stearic acid in concentration above 0.2% will accelerate high temperature aging of polyurethane rubber while the quaternary ammonium salt under the same condition shows no effect on aged physical properties.

DISCUSSION OF DETAILS

The basic contribution to the art of forming polyurethane materials provided by the present invention is the inclusion of a quaternary ammonium salt as hereinbefore defined as an active ingredient in the mixture of reagents used to form the polyurethane material. Accordingly, the other components of the mixture of reagents used in the process may be any of those known to the art as suitable for polyurethane manufacture. Extensive discussions of polyurethane forming materials and methods can be found in the technical literature and issued patents and by way of example, disclosures of this type are incorporated herein by reference to U.S. Patents 2,741,800 and 3,108,975, British Patent 844,525 and German Patent 1,112,285.

In the use of quaternary ammonium salts as components of polyurethane materials in accordance with the invention, it is contemplated that such ingredients can be employed in any amount which simple experimentation will reveal produces satisfactory catalyzation of the polyurethane forming reaction mixture and at the same time imparts a desired degree of biocidal protection to the final polyurethane material. Advantageously, the quaternary ammonium salts are used in an amount between about 0.1 to 5 parts for each 100 parts of reactants employed in the manufacture of the polyurethane material. The quaternary ammonium salts as defined are unique in giving the required degree of catalytic activity in these concentrations which also impart to the final products a useful measure of biocidal protection. Quantities outside this range, however are contemplated for use in the invention, particularly where special catalytic or biocidal effects are desired. The biocide in addition to being added to the ingredients, such as the polyester, before reaction to make the polyurethane, may be added to the polyurethane rubber at the time other compounding agents are added and before curing.

Preferred salts for use in the invention are given in the foregoing examples. Additional examples of specific compounds which may be employed include:

tetrahexyl ammonium saccharinate
octadecyl trimethyl ammonium saccharinate
dodecyl cyclohexyl dimethyl ammonium saccharinate
decyl diphenyl methyl ammonium saccharinate
hexyl dimethyl naphthyl-1 ammonium saccharinate
didodecyl diethyl ammonium saccharinate
octadecyl pyridinium saccharinate Although not equal in all respects, the corresponding quaternary ammonium cyclamates may be used. The saccharinates are the salts of o-sulfobenzoic acid imide and the cyclamates are salts of cyclohexyl sulfamic acid. Aqueous suspensions of these quaternary salts and of others which may be used within contemplations of the invention give pH readings in the general range of weakly acid to weakly basic, i.e., 5.0 to 9.5. Their basic strength does not approach that of alkali metal hydroxides or quaternary ammonium bases.

As to the other essential ingredients of the polyurethane manufacture, there is a polyisocyanate and an active hydrogen material, the latter reagent being advantageously selected from the general class of hydroxyl-containing polymers referred to in the polyurethane industry as polyesters, polyethers and polyester amides. The initial polyurethane forming mixture may be created by direct admixture of all of the desired components or by use of the technique which employs formation of prepolymers by partial reaction of a small amount of one reagent with a large amount of another followed by the combination of the prepolymer with further reactants. Other adjuvants known to be useful in forming non-cellular polyurethane material may be included in the reaction mixture at any suitable stage. Such components would include cross-linking agents, surface active agents, dyes, pigments, fireproofing agents, plasticizers, hydrolytic protectants, e.g., polycarbodiimide, and the like. A single quaternary ammonium salt may constitute the only catalyst of the reaction mixture, but it may be desirable, particularly with some classes of polyisocyanates and hydroxyl-containing polymers, to employ mixtures of the salts or mixtures with other known catalysts.

By way of example of starting materials to be used in the new processes, suitable polyisocyanates include aliphatic diisocyanates, e.g., hexamethylene diisocyanate; aromatic diisocyanates, e.g., tolylene diisocyanates, diphenylmethane-4:4'-diisocyanate, and p-phenylene diisocyanates and chlorophenylene-2:4'-disocyanate and cycloaliphatic diisocyanates, e.g., dicyclohexylmethane diisocyanate. Triisocyanates which may also be used, e.g., 2:4:6-triisocyanatotoluene and 2:4:4'-triisocyanatodiphenyl ether.

Polyesters or polyesteramides to be used may be made from dicarboxylic acids and polyhydric alcohols and, as necessary, diamines or aminoalcohols. Suitable dicarboxylic acids include succinic, adipic, suberic, azelaic, and sebacic acids as well as aromatic acids such as phthalic, isophthalic and terephthalic acids. Mixtures of acids may be used. Examples of polyhydric alcohols include glycols such as ethylene glycol, 1:2-propylene glycol, 1:3-butylene glycol, diethylene glycol, trimethylene glycol, tetramethylene glycol, pentamethylene glycol, hexamethylene glycol and decamethylene glycol. Mixtures of glycols may be used and other polyhydric alcohols, such as trimethylolpropane, pentaerythritol or glycerol, may be included in varying amounts, or used alone according to the desired rigidity of the products. Examples of diamines and aminoalcohols include ethylene diamine, hexamethylene diamine, monoethanolamine, phenylene diamines and benzidine.

Examples of polyethers for use in the new processes are hydroxyl-ended polymers and copolymers of cyclic oxides and especially of ethylene oxide, epichlorhydrin, 1:2-propylene oxide, 1:2-butylene oxide or other alkylene oxides, oxacyclobutane and substituted oxacyclobutanes, and tetrahydrofuran. Such polyethers may be linear polyethers, as are prepared, for example, by the polymerization of an alkylene oxide, in the presence of a glycol initiator. Alternatively there may be used branched polyethers prepared, for example, by polymerizing an alkylene oxide in the presence of a substance having more than two active hydrogen atoms, for example, glycerol, pentaerythritol and ethylene diamine. Mixtures of linear and branched polyethers, or mixtures of polyesters and polyethers, may be used if desired. Unsaturated polyethers, polyesters or equivalent reagents may be used to form unsaturated polyurethanes which may be later vulcanized by sulfur curing.

As to other catalysts which may be used in admixture with the saccharinates, there may be mentioned tertiary amines catalysts, of which examples include triethylamine, tri-(n-butyl) amine, N:N:N':N'-tetramethylhexamethylene diamine, N:N-dimethylbenzylamine, N:N-diethylbenzylamine, N:N-dimethylcyclohexylamine, N-methyl-piperidine, N-ethylpiperidine, N-methylmorpholine, N-ethylmorpholine, N:N'-dimethylpiperazine, N:N:N':N'-tetramethyl-1:3-butanediamine, beta-diethylaminopropionamide, 1:4-diazabicyclo-[2:2:2]-octane (triethylene diamine) pyrrolizidine, 2-diethylaminoethyl acetate, 2-diethylaminoethylcarbamilate, and 2-diethylaminoethylbenzyl ether and the non-basic metal catalysts, e.g., manganous and manganic acetylacetonates and di-n-butyl tin dilaurate.

The embodiments of the invention in which an exclusive property or right is claimed are defined as follows:

1. A polyurethane material containing a quaternary ammonium salt of the general formula:

wherein

Z is the saccharinate or cyclamate anion, $R_1$ is an alkyl radical containing up to 24 carbon atoms, and $R_2$, $R_3$ and $R_4$ are radicals containing up to 24 carbon atoms selected from the group alkyl, cycloalkyl, aralkyl, aryl, two or three of which may be combined in a ring structure incorporating the nitrogen atom as a heterocyclic group.

2. A material as claimed in claim 1 wherein said salt is trialkyl arlkyl ammonium saccharinate in which one of the alkyl groups contains 10 to 18 carbon atoms, the other two alkyl groups contain 1 to 6 carbon atoms and said aralkyl group consists of a monocyclic aromatic hydrocarbon radical attached to an alkylene radical containing 1 to 6 carbon atoms.

3. A material as claimed in claim 2 wherein said saccharinate is alkyl dimethyl benzyl ammonium saccharinate in which the alkyl moiety is a statistical mixture of alkyl groups equivalent to about 15 carbon atoms.

4. A material as claimed in claim 1 wherein said saccharinate is lauryl isoquinolinium saccharinate.

5. A polyurethane material as claimed in claim 1 which is a cured elastomer.

References Cited

UNITED STATES PATENTS

| | | | |
|---|---|---|---|
| 3,108,975 | 10/1963 | Lambert et al. | 260—2.5 |
| 3,223,704 | 12/1965 | Shibe et al. | 260—247.1 |
| 3,280,131 | 10/1966 | Wakeman et al. | 260—286 |
| 3,294,752 | 12/1966 | Wilkinson | 260—77.5 |
| 3,340,265 | 9/1967 | Wakeman et al. | 260—286 |

OTHER REFERENCES

Chemical Abstracts, vol. 63, No. 10, Nov. 8, 1965, page P12980b.

Chemical Abstracts, vol. 63, No. 11, Nov. 22, 1965, page 15407g.

DONALD E. CZAJA, Primary Examiner

R. W. GRIFFIN, Assistant Examiner

U.S. Cl. X.R.

106—15; 117—161, 167; 260—2.5, 32.4, 40, 75, 77.5, 999